United States Patent [19]

Robinson

[11] 4,313,618

[45] Feb. 2, 1982

[54] RESILIENT SUSPENSION MEANS FOR LIGHT VEHICLES

[76] Inventor: Russell S. Robinson, 3330 N. Webster Pl., Tucson, Ariz. 85715

[21] Appl. No.: 115,682

[22] Filed: Jan. 28, 1980

[51] Int. Cl.³ .............................................. B60G 11/02
[52] U.S. Cl. .................................... 280/688; 280/719; 280/720
[58] Field of Search ................. 28/660, 669, 688, 718, 28/719, 720; 267/36 R, 54 R; 280/63

[56] References Cited

U.S. PATENT DOCUMENTS

| 508,894 | 11/1893 | Maxwell | 280/719 |
|---|---|---|---|
| 2,458,548 | 1/1949 | Aronson | 280/719 |
| 3,002,742 | 10/1961 | Troy | 280/719 |
| 3,700,254 | 10/1972 | Eck | 280/63 |
| 4,077,645 | 3/1978 | Dortch | 280/720 |

*Primary Examiner*—Robert R. Song

[57] ABSTRACT

A resilient suspension means for vehicles having at least one pair of oppositely disposed wheels, said suspension means being particularly adaptable to trailers for towing behind bicycles and mopeds. Said suspension means comprises a transversely-disposed flexurally resilient axle component having axle shafts at each end for rotatably supporting a wheel, said component usually being formed with a downwardly-concave curvature and the center of said component being connected to the center of the body of the vehicle in such manner that the outer ends of said component can move substantially vertically, longitudinal movement of the ends of said component being prevented by a device connected to said body which restrains said outer ends of said component against forward or rearward movement. Stops may be provided which impart an upward deflection and strain to the ends of said axle component to minimize excessive bouncing. The invention also provides for upwardly-extending structures to be connected to the ends of said resilient axle component outside the sides of the body of the vehicle, to the top ends of which structures the axle shafts are connected in such manner that the center of gravity of the vehicle may be lowered, or larger diameter wheels may be fitted without raising said center of gravity, or both.

3 Claims, 4 Drawing Figures

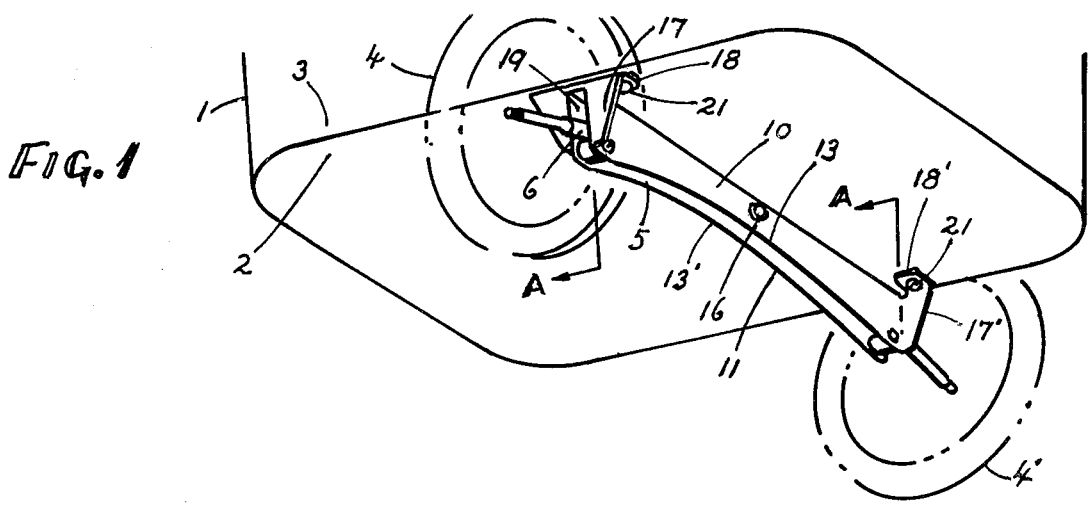
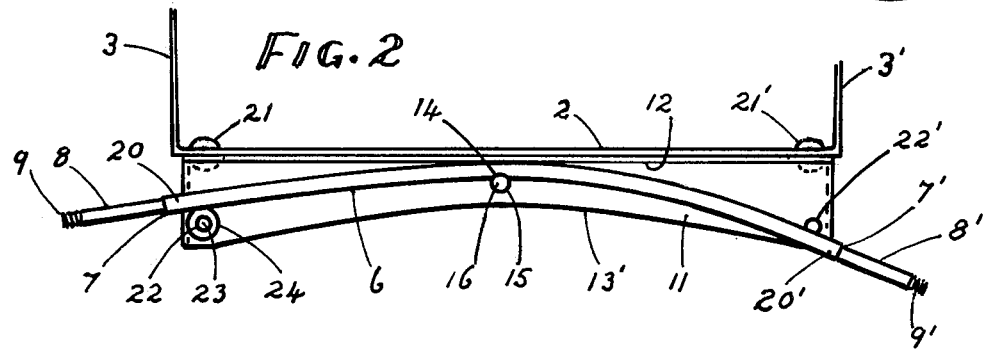
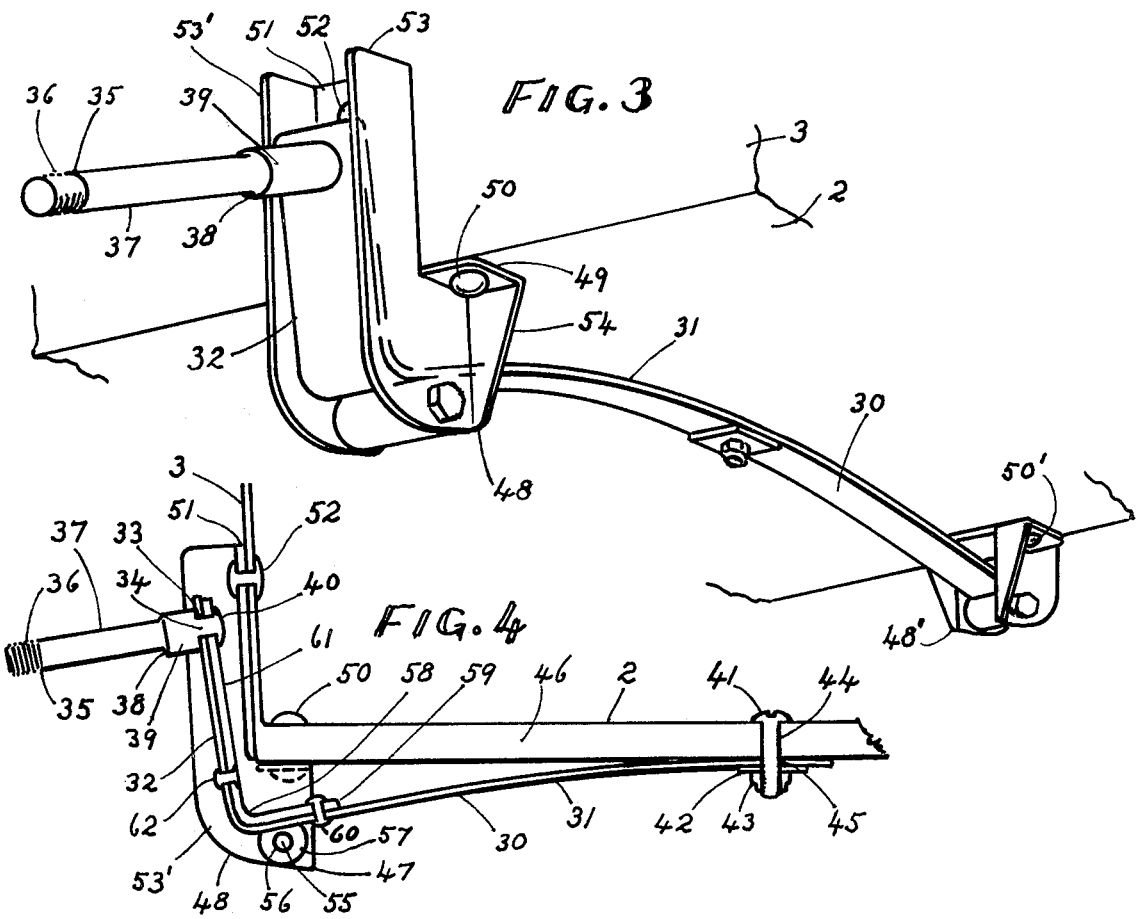

RESILIENT SUSPENSION MEANS FOR LIGHT VEHICLES

This invention relates to improved resilient suspensions for wheeled vehicles having at least one pair of oppositely-disposed wheels, and more particularly to a very simple resilient suspension means for use on light trailers capable of being connected behind and towed by vehicles such as pedal-propelled bicycles or motor-powered mopeds.

Most if not all trailers for towing behind cycles have wheels rotatably mounted on axle shafts which are rigidly connected to the frame or structure of the trailer. It has been found that such light trailers are prone to react violently to road shocks and often to roll over when towed at relatively high speed, particularly behind a moped. The interposition of a resilient suspension means between the axles and the body of such vehicles greatly alleviates such undesirable effects. The disadvantage with resilient suspensions for such vehicles as presently known, however, is that they are too expensive and heavy for incorporation in such low cost, light weight trailers, and are dimensionally too deep, when interposed between the floor structure of the body and the axle to keep the center of gravity of the vehicle at a reasonable height above the ground.

A major object of this invention is to provide a resilient suspension means for such vehicles that is simple and inexpensive to manufacture, is light in weight, and is dimensionally sufficiently shallow as not to excessively raise the center of gravity. This object is realized according to the invention by providing a flexurally resilient axle component to the ends of which the wheels are rotatably mounted, said component being anchored to the body or to structure connected to the body adjacent the center of the body of the vehicle, the outer ends of said component being free to strain vertically as cantilever beams but being constrained from longitudinal movement by a device connected to said body, which prevents said outer ends from straining forwardly or rearwardly. To prevent synchronous movements or excessive bouncing of the outer ends of said component it is also an object to provide a stop which restrains said component from downward movement and which may also be used to apply an initial upward strain to said component. To relieve impacts that would occur when said flexurally resilient axle component returns downwardly against said stop, it is a further object to provide a resilient shock absorber disposed between the contacting surfaces of said stop and said component.

A further major object of the invention is to provide a variation of said resilient suspension means which enables the center of gravity of the vehicle to be lowered or, alternatively, enables larger diameter wheels to be fitted to the axles without raising the center of gravity of the vehicle, or both. Said further major object is realized by providing upwardly-extending structures formed on or connected to the outer ends of said flexurally resilient axle component and disposed outside the side of the body of the vehicle adjacent the top end of which outwardly-extending axle shafts for receiving rotatably mounted wheels are connected, said structures being constrained against longitudinal movement by extensions of said device which extend upwardly adjacent the sides of the body. It is also an object to provide curvature of the flexurally resilient axle component with respect to the fixed structure that supports it so that, as the outer ends of said component strain upwardly as a result of cargo load in the vehicle or of road shocks, the moment arm of the remaining cantilever portion of said component is progressively reduced in such manner that the force required to further deflect said component progressively increases. Further objects will become apparent by a description of the examples depicted in the following drawings, in which:

FIG. 1 is a perspective view from under the rear left side of a cycle trailer having a very simple resilient suspension means according to the invention.

FIG. 2 is a cross section of the lower portion of the example of FIG. 1, said section being taken through a vertical plane as defined by indicators A—A on FIG. 1.

FIG. 3 is a perspective view from under the rear left side of a cycle trailer embodying the preferred form of the invention.

FIG. 4 is a similar section to FIG. 2 but of the example according to FIG. 3 which shows the center and left side only of the resilient suspension means.

Referring to FIGS. 1 and 2, this example comprises portion of a cycle trailer having a body 1 with a relatively thin floor 2, and sides 3, 3', bicycle type wheels 4, 4' which are shown only on FIG. 1 and in phantom lines for purposes of clarity, and a resilient suspension means 5 of great simplicity. Said means comprising a flexurally resilient axle component 6 which extends across the under side of floor 2 of body 1, said component being constructed from commercial spring steel rod and formed with a downwardly concave curvature, as shown on FIG. 2. The opposite ends of said component are provided with shoulders 7, 7' which are disposed outwardly of the sides 3, 3' of body 1, and cylindrical shafts 8, 8' the outer ends of which terminate in threads 9, 9' which receive axle nuts (not shown). Each said shoulder, shaft, thread and nut are adapted to support, adjust and lock in position a rotatable wheel 4 which need not be described again in any of the examples as being well known and beyond the scope of the invention.

Flexurally resilient axle component 6 is guided by and cooperates with a device 10 which, according to this example, comprises a channel 11 formed of sheet metal and having a web 12 and downwardly-extending flanges 13, 13'. Said channel is disposed transversely across the underside of floor 2 of body 1 and terminates adjacent the sides 3, 3' of said body. Flanges 13, 13' are spaced to provide close but slidable accommodation for axle component 6. The center of said axle component is provided with a curved notch 14, and flanges 13, 13' are provided with a hole 15 through which a bolt 16 is disposed which cooperates with said notch in such manner as to hold axle component 6 substantially in contact with the under side of web 12 of channel 11 and also to prevent said component from sliding laterally between said flanges. Bolt 16 is secured to channel 11 by a locknut (not shown) in known manner. The curvature of axle component 6 is such that if one end of said component is strained upwardly, the contact line between that end of said component and the under side of said web moves progressively outwardly, thereby reducing the moment arm of the remaining cantilever of said axle component. Accordingly, the force required to further strain said component upwardly progressively increases. As shown particularly on FIG. 1, each end of flanges 13 and 13' of channel 11 is provided with a gusset 17, 17', etc. and a mounting pad 18, 18', etc., which are so disposed as to provide an open slot 19 between the outer ends of said flanges which provides for unobstructed vertical movement but prevents forward or rearward movement of the outer portions 20, 20' of axle component 6. Pads 18, 18', etc., are so disposed as to contact the under side of floor 2 adjacent its outer edges, each said pad being connected to said floor by a rivet 21, 21', etc., in known manner, said rivets being disposed in registering holes (not shown) formed in said pads and said floor before assembly.

The outer ends of downwardly curved axle component 6, according to this example, take up a free rest position as shown on the right side of FIG. 2. Some small scale trailers may utilize the invention with an unconstrained and freely springing axle component as so shown. In many trailers according to this invention, however, it is preferable to restrain the ends of the axle component against movement below the free rest position or to impart to said component an initial upward deflection. Such a deflection is realized in the present example by providing holes 22, 22' through flanges 13, 13' adjacent the outer ends of channel 11, said holes being disposed a desired distance above said free rest position of said axle component. Each outer portion 20, 20' of said component is then strained upwardly and retained by a stop pin 23 which is disposed in hole 22 with a similar pin in hole 22'. Outer portions 20, 20' of said component thereby apply a downward thrust on said stop pins which must be exceeded as a result of upward force applied by one or both wheels 4, 4' before the contacting portions of said axle component and said stop pins are separated. Stop pins 23, 23' are retained in position in channel 11 by means of cotter pins (not shown) in known manner.

To relieve return shocks between said stop pin and the contacting area of axle component 6, the invention provides for shock-absorber means to be interposed between the contacting surfaces of said stop pins and said component. According to the present example said shock absorber comprises a thick washer 24 formed to rubber which is disposed over the portion of each stop pin 23 and extends between flanges 13, 13' of channel 11.

Referring to FIGS. 3 and 4 in this example, flexurally resilient axle component 30 comprises a spring leaf 31 formed from a length of spring steel strip. The outer ends of said component extend outwardly beyond the sides 3 of body 1, each said outer end being provided with an upwardly-extending wing 32 which is formed integrally from said spring steel strip. The transversely disposed portion of spring leaf 31 is formed into a downwardly concave curve, as shown on FIGS. 3 and 4. A hole 33 is formed near the upper end of each said wing of spring leaf 31 through which the stub 34 of axle shaft 35 is disposed. Axle shaft 35 comprises, from its outer extremity inwardly, a thread 36, a shaft 37, and a shoulder 38 of similar construction and purpose to the similarly named items of the FIGS. 1 and 2 example. Each axle shaft 35 is also provided with a boss 39 of sufficient length to separate shoulder 38, and the wheel it positions (not shown) by a desired distance from the sides 3 of body 1 and from wings 32 of spring leaf 31. Stub 34 has a diameter slightly smaller than that of hole 33 and is of sufficient length to extend through said hole and provide material for a head 40 which has been peaned over in known manner thereby rigidly connecting opposite axle shafts 35 to the opposite wings 32 of axle component 30. The center of spring leaf 31 is connected to the lateral center of floor 2 of body 1 by means of a bolt 41, washer plate 42, and elastic stop nut 43, said bolt being disposed in registering holes 44 and 45 formed in said floor and said spring leaf, respectively.

The floor 2 of body 1 according to this example comprises a panel 46 formed of thick plywood. Because of the stiffness of said panel, a continuous channel extending across the under side of the body 1, as in channel 11 of the FIGS. 1 and 2 example, is not necessary so that the weight and expense of such a channel can be eliminated. Accordingly, device 47, according to the present example, comprises a pair of brackets 48, 48', each of which are disposed under the opposite sides of floor 2. Bracket 48 and opposite bracket 48' comprise firstly, a horizontal web 49 which is disposed underneath floor panel 46 and is connected thereto by a pair of rivets 50, 50' (the forward pair of said rivets not being shown for purposes of clarity), said rivets being disposed in registering holes (not shown) formed in said panel and said horizontal webs before assembly; secondly a vertical web 51 which is disposed outside the side 3 of body 1 and is connected thereto by a rivet 52 in similar manner to that of rivets 50, 50', thirdly, a pair of flanges 53, 53' which are formed and spaced to provide spring leaf 31 and wings 32 of axle component 30 with freedom to move vertically but to constrain same against forward or rearward movement; and fourthly, stiffening gussets, 54 which provide longitudinal bracing for the lower end of each flange 53, 53' with respect to horizontal web 49.

A stop bolt 55 is disposed in holes 56 formed in the lower portion of flanges 53, 53'. Said bolt is disposed in such manner as to prevent downward movement of spring leaf 31 and to apply a desired initial upward deflection to said spring leaf. A shock absorber comprising a length of rubber tubing 57 is disposed on stop bolt 55 and between the inner surfaces of flanges 53, 53', said shock absorber cushioning the return impacts of said leaf as it is stopped against said bolt. Bolt 55 is retained in known manner by an elastic stopnut (not shown).

In some applications of this example where the vertical depth of the wings 32 is large with respect to their torsional stiffness, longitudinal road reactions may cause an undue twisting of said wings and resulting misalignment of the wheels. To minimize such effects the invention provides for a reinforcement of such wings. One such reinforcement is shown on FIG. 4. Referring to FIG. 4, a reinforcing member 58 is formed from a length of flat steel strip having no greater width than that of spring leaf 31. Said member is provided with an inwardly-extending arm 59 which is connected to the outer end of spring leaf 32 by rivet 60, and with an upwardly-extending arm 61, which is connected to wing 32 by a rivet 62 and also by head 40 of stub 34 of axle shaft 35.

It will be clearly understood that within the ambit of the invention the upwardly-extending wings 32 of spring leaf 31 may instead comprise separate upwardly-extending structures which are connected adjacent the outer ends of the flexurally resilient axle component in such manner as to provide the raised positioning of the axle shafts 35 and wheels 4, 4'. Also it will be understood that if the floor of the FIGS. 3 and 4 example is thin, or if the body structure comprises a fabric and tube structure, device 47 may comprise a channel extending across the body as in the channel 11 of the FIGS. 1 and 2 example, and vice versa. It will also be understood that the resilient axle component may be formed with no curvature, or with an upwardly concave curvature, as governed by the form and construction of the body of the vehicle and/or of said device utilized. Finally, as the longitudinal support device may be embodied in the construction of the body of the vehicle instead of being a separate device connected to said structure as described in the above examples, it will be understood that the members or elements of said device may, according to the invention, be considered as members or elements of said body.

Having clearly described the invention what I claim is:

1. In a vehicle having a body and oppositely disposed wheels, a resilient suspension comprising
a flexurally resilient axle component disposed transversely across said body, the center of said component being connected to said body, and each end of said component having an axle shaft extending outside the sides of said body and adapted to rotatably support a wheel,
and a device connected to said body which restrains the outer ends of said component against forward or rearward movement, said device comprising channel means having a web connected to said body, and flanges between which the outer portions of said component can move substantially vertically.

2. In a vehicle having a body and oppositely disposed wheels, a resilient suspension comprising
a flexurally resilient axle component disposed transversely across said body, the center of said component being connected to said body and the outer ends of said component being formed to comprise upwardly extending wings disposed outside the sides of said body, the upper end of each said wing having an axle shaft connected thereto,
and a device connected to said body which restrains the outer ends of said component against forward or rearward movement, said device comprising channel means having a web connected to said body and opposite flanges between which the outer portions of said component and said wings can move substantially vertically.

3. A resilient suspension according to claims 1 or 2 in which said device is provided with stops disposed adjacent each end thereof, each said stop cooperating with an outer portion of said component to restrain same against excessive downward movement.

* * * * *